(12) United States Patent
Spink (10) Patent No.: US 12,416,796 B2
(45) Date of Patent: Sep. 16, 2025

(54) AUTOFOCUS SYSTEM, AN OPTICAL SYSTEM, A METHOD FOR AN AUTOFOCUS SYSTEM AND A COMPUTER PROGRAM

(71) Applicant: Leica Instruments (Singapore) Pte. Ltd., Singapore (SG)

(72) Inventor: Roger Spink, Balgach (CH)

(73) Assignee: Leica Instruments (Singapore) Pte. Ltd, Singapore (SG)

( * ) Notice: Subject to any disclaimer, the term of this patent is extended or adjusted under 35 U.S.C. 154(b) by 173 days.

(21) Appl. No.: 18/042,624

(22) PCT Filed: Aug. 19, 2021

(86) PCT No.: PCT/EP2021/073049
§ 371 (c)(1),
(2) Date: Feb. 23, 2023

(87) PCT Pub. No.: WO2022/043184
PCT Pub. Date: Mar. 3, 2022

(65) Prior Publication Data
US 2023/0359012 A1  Nov. 9, 2023

(30) Foreign Application Priority Data
Aug. 27, 2020 (EP) .................................. 20193239

(51) Int. Cl.
*G02B 21/24* (2006.01)
*H04N 23/13* (2023.01)
*H04N 23/67* (2023.01)

(52) U.S. Cl.
CPC .......... *G02B 21/244* (2013.01); *H04N 23/13* (2023.01); *H04N 23/675* (2023.01)

(58) Field of Classification Search
CPC .... G02B 21/244; G02B 21/245; H04N 23/13; H04N 23/675; H04N 25/13; H04N 23/56; A61B 3/0025; A61B 3/1241; A61B 3/14; A61B 3/10; G06T 5/50; G06T 5/94; G06T 7/0014; G06T 7/11; G06T 2207/10024; G06T 2207/10152; G06T 2207/30041; G06T 2207/30101; G06V 30/18114; G06V 40/15
See application file for complete search history.

(56) References Cited

U.S. PATENT DOCUMENTS

| | | | |
|---|---|---|---|
| 8,760,756 B2 * | 6/2014 | Price | G02B 21/244 359/368 |
| 9,857,663 B1 | 1/2018 | McClatchie | |
| 10,247,910 B1 * | 4/2019 | Putman | G02B 21/02 |

(Continued)

FOREIGN PATENT DOCUMENTS

| | | | |
|---|---|---|---|
| WO | 20100044870 A1 | | 4/2010 |
| WO | WO2010/044870 A1 * | | 4/2010 |

*Primary Examiner* — Alazar Tilahun
(74) *Attorney, Agent, or Firm* — 2SPL Patent Attorneys PartG mbB; Yong Beom Hwang (57) ABSTRACT

An embodiment of an autofocus system (100, 400) is configured to receive a first signal (102a, 402a) corresponding to a first wavelength range and to receive a second signal (102b, 402b) corresponding to a second wavelength range. The autofocus system (100, 400) is further con-5 figured to determine an output signal (106, 406) comprising a focus setting information using the first signal (102a, 402a) and the second signal (102b, 402b).

9 Claims, 6 Drawing Sheets

(56) References Cited

U.S. PATENT DOCUMENTS

| | | | |
|---|---|---|---|
| 12,124,020 B2* | 10/2024 | Sandkuijl | G01N 1/04 |
| 2013/0100272 A1* | 4/2013 | Price | G02B 21/365 |
| | | | 348/E5.045 |
| 2015/0330892 A1 | 11/2015 | Cerignoli et al. | |
| 2017/0219834 A1* | 8/2017 | Horiguchi | H04N 25/00 |
| 2020/0288965 A1* | 9/2020 | Gamliel | G06T 5/94 |

* cited by examiner

AUTOFOCUS SYSTEM, AN OPTICAL SYSTEM, A METHOD FOR AN AUTOFOCUS SYSTEM AND A COMPUTER PROGRAM

TECHNICAL FIELD

Examples relate to autofocus systems, optical systems, methods for autofocus systems and computer programs.

BACKGROUND

Autofocus systems are often used in optical systems e.g. cameras or microscopes to generate sharp images of objects being observed. For automatic focusing, an appropriate focus setting is determined such that inherent optical elements of the optical system can be moved to set the focus.

In neurosurgery anatomical structures are often highly magnified and viewed beyond a visible spectrum such as ultraviolet or infrared fluorescence spectrum. Due to dispersion, autofocus systems often reach limits in such applications using high magnifications or light indicating a broad spectral range.

Some autofocus systems use the information of white light for focusing. There are difficulties in focusing e.g. fluorescing objects indicating a light spectrum beyond the visible wavelength range. To generate sharp images beyond white light, manual readjustment of the focus is usually applied. However, manual readjustments are often time-consuming and hence not suitable for fluorescence light emitted within a short time interval. Manuel focusing is also subjective and often not sufficient to find the best focus.

In other implementations, lasers are used to determine a distance to the observed object for focusing. These autofocus systems do not consider the spectrum of observed light.

Above, current optical systems have difficulties in generating sharp images for the entire spectral range rather than for a specific wavelength range of observed light.

SUMMARY

Hence, there is a desire for an improved autofocus system.

This desire is addressed by the subject matter of the independent claims.

An embodiment of an autofocus system is configured to receive a first signal corresponding to a first wavelength range and to receive a second signal corresponding to a second wavelength range. The autofocus system is further configured to determine an output signal comprising a focus setting information using the first signal and the second signal. The autofocus system can use two signals of e.g. two imaging sensors of an optical system to generate the output signal used for focusing. The signals may comprise different contents depending on the wavelength ranges being considered. Using the first signal considers a first wavelength range e.g. of visible light and using the second signal considers a second wavelength range e.g. of emitted infrared light. By this means, sharp images of objects can be generated for wavelength ranges beyond white light or for the entire wavelength range of the observed light.

According to some embodiments, the autofocus system is further configured to receive information on an operation mode, wherein the operation mode indicates a use of the first wavelength range or the second wavelength range. Further, the autofocus system is configured to use the information on the operation mode for generating the output signal. The information on the operation mode may comprise an operating instruction for the autofocus system. The autofocus system can determine the focus setting information according to the received information on the operation mode. By this means, an operator can observe images of the object with different focus settings. Depending on the operation mode, images can be sharp for only one wavelength range such as only for white light or only for infrared light, or for two or more wavelength ranges such as for white light and infrared light simultaneously.

According to some embodiments, the first signal comprises an image of an object in the first wavelength range and the second signal comprises an image of the object in the second wavelength range. A first image of the first signal may comprise image data which can be analyzed to bring the first image into focus. Analogous, a second image of the second signal may comprise image data which can be analyzed to bring the second image into focus. By this means, focus settings can be adjusted according to different spectral image information.

According to some embodiments, the autofocus system is further configured to use the first signal to determine a first focus and the second signal to determine a second focus. Further, the autofocus system is configured to determine the focus setting information using the first focus and the second focus. The first focus can be determined by e.g. contrast enhancement of the first image and the second focus can be determined by e.g. contrast enhancement of the second image. The autofocus system can use both focuses of the images to determine an appropriate focus setting information. The focus setting information can be used to e.g. control a set of optical components to generate the first image with the first focus and the second image with the second focus.

According to some embodiments the first wavelength range corresponds to visible light and the second wavelength range corresponds to fluorescence light emitted by an object. The autofocus system can focus according to visible light being reflected on the surface of the object. Further, the autofocus system can focus according to e.g. infrared or ultraviolet light due to fluorescence emission of the object.

An embodiment of an optical system comprises the autofocus system according to one of the previous embodiments and a controller configured to control a focus system of the optical system using the output signal. The controller can receive the output signal of the autofocus system for controlling the focus system according to the determined focus setting information. The focus system of the optical system may comprise moveable optical elements or hardware components which can be changed in configuration to set a focus according to one or more wavelength ranges being considered.

According to some embodiments, the optical system further comprises a first sensor configured to generate a first image in the first wavelength range and a second sensor configured to generate a second image in the second wavelength range. The object being observed by the optical system can be imaged by the first sensor being sensitive to the first wavelength range. The object can be further imaged by the second sensor being sensitive to the second wavelength range. By means of two sensors with different sensitivity, different images can be analyzed for focusing. Hence, a focus setting can be determined according to different wavelength ranges. The sensors may be also beneficial for generating a combined image being in focus for several wavelength ranges.

According to some embodiments, the optical system comprise a main focus system for the first sensor and a fine focus system for the second sensor. The main focus system can be controlled to generate an image to be focused on the first sensor. The main focus system can be further used to generate a sharp intermediate image to be viewed by an ocular. The fine focus system can be controlled to generate an image to be focused on the second sensor.

According to some embodiments, the optical system further comprises an imaging system configured to combine the first image and the second image into an observable image. The imaging system can be used to generate a combined image comprising the first and the second image. The combined image can be in focus for the first and second wavelength range simultaneously.

According to some embodiments, the optical system is a microscope or a surgical microscope. The microscope may comprise further optical or technical components to improve an image quality, a handling, an operation or reduce an optical aberration of the optical system. The surgical microscope may comprise further technical components to improve a field of view, a stability or mobility of the optical system to meet the requirements for surgery.

An embodiment of a method for an autofocus system comprises receiving a first signal corresponding to a first wavelength range and receiving a second signal corresponding to a second wavelength range. Further, the method comprises determining an output signal comprising a focus setting information using the first signal and the second signal. Two signals of e.g. two imaging sensors of an optical system can be used to generate the output signal for focusing. The signals may comprise different contents depending on the wavelength ranges being considered. Using the first signal considers a first wavelength range e.g. of visible light and using the second signal considers a second wavelength range e.g. of emitted infrared light. By this means, sharp images of objects can be generated for wavelength ranges beyond white light or for the entire wavelength range of the observed light.

According to some embodiments, the method further comprises receiving information on an operation mode wherein the operation mode indicates a use of the first wavelength range or the second wavelength range. The method further comprises using the information on the operation mode for generating the output signal. The information on the operation mode may comprise an operating instruction for the autofocus system. The focus setting information can be determined according to the received information on the operation mode. By this means, an operator can observe images of the object with different focus settings. Depending on the operation mode, images can be sharp for only one wavelength range such as only for white light or only for infrared light, or for two or more wavelength ranges such as for white light and infrared light simultaneously.

According to some embodiments, the first signal comprises an image of an object in the first wavelength range and the second signal comprises an image of the object in the second wavelength range. A first image of the first signal may comprise image data which can be analyzed to bring the first image into focus. Analogous, a second image of the second signal may comprise image data which can be analyzed to bring the second image into focus. By this means, focus settings can be adjusted according to different spectral image information.

According to some embodiments, the method further comprises using the first signal to determine a first focus and the second signal to determine a second focus. Further, the method comprises determining the focus setting information using the first focus and the second focus. The first focus can be determined by e.g. contrast enhancement of the first image and the second focus can be determined by e.g. contrast enhancement of the second image. Both focuses of the images can be used to determine an appropriate focus setting information. The focus setting information can be used to e.g. control a set of optical components to generate the first image with the first focus and the second image with the second focus.

An embodiment of a computer program with a program code performs the method for an autofocus system according to the previous description when the computer program is executed by a processor. The computer program provides a program code with the prescribed method which can be used in a software of an arbitrary apparatus such as a microscope or a camera system.

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Figure 1:
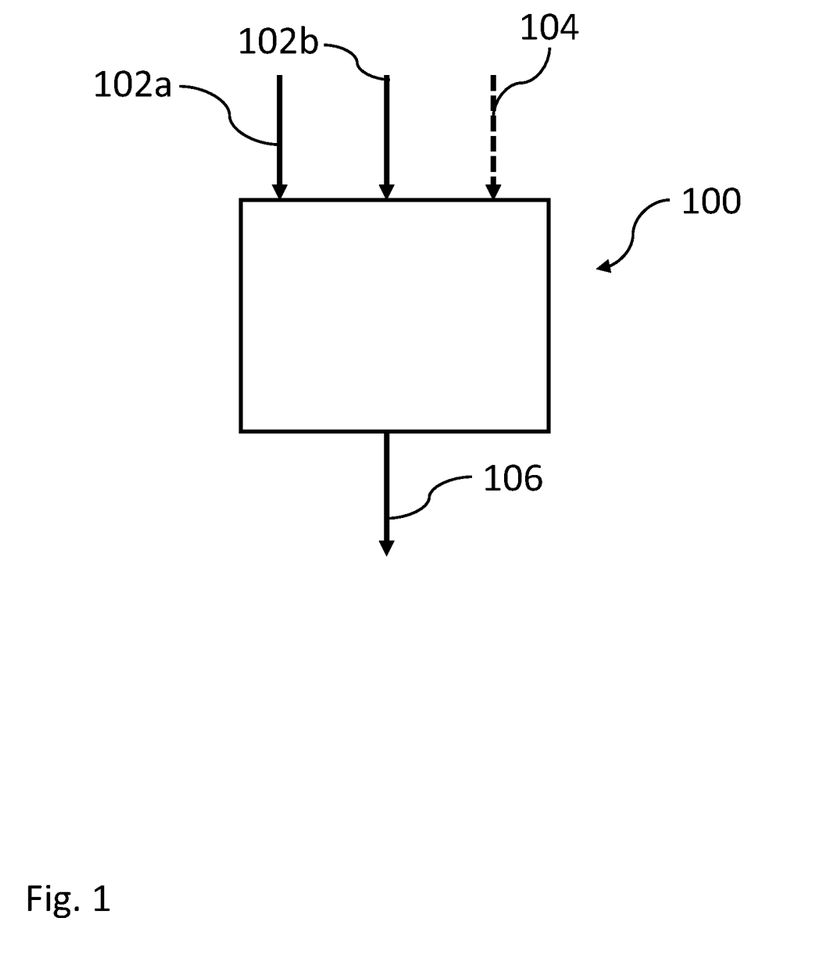
FIG. 1 illustrates an embodiment of an autofocus system.

FIG. 1 shows an embodiment of an autofocus system 100 configured to receive a first signal 102a, a second signal 102b and a signal comprising an information on an operation mode 104 to generate the output signal 106. The first signal 102a corresponds to a first wavelength range and the second signal 102b corresponds to a second wavelength range. For example, the first signal 102a may be generated by a first sensor being sensitive to light indicating the first wavelength range. Similarly, the second signal 102a may be generated by a second sensor being sensitive to light indicating the second wavelength range. The first and second sensor may generate the first and second signal according to an observed light being generated by an object to be observed.

The first and the second wavelength range can be different from each other or can partly or completely comprise the same range. For example, a wavelength range may correspond to visible light, to a particular color of visible light, to infrared light, to ultraviolet light or other light indicating broader or narrower wavelength ranges.

The first and the second signal can be used to determine the output signal 106. The output signal 106 comprises a focus setting information which can be used for focusing the object appropriately by considering the two wavelength ranges separately. For example, the output signal 106 can be received by a controller of a microscope. The controller may change a configuration in the microscope such as by displacing optical elements relative to each other or relative to the observed object. By this means, the observed object can brought into focus regarding the first and the second wavelength range.

In the embodiment of FIG. 1, signal 104 is also used to generate the output signal 106. Signal 104 comprises information on an operation mode of the autofocus system 100. The operation mode indicates a use of the first wavelength range or the second wavelength range and may determine a functionality of the autofocus system 100. The autofocus system 100 may operate according to the first wavelength range or the second wavelength range. Information on the operation mode may be provided by signal 104 e.g. from a user interface. For focusing the object according to different specifications, the operation mode may be used to generate different output signals 106 comprising different focus setting information.

For example, the observed object generates light with a broad spectrum. The observed light can be focused according to different operation modes indicating a different use of the wavelength ranges. The first wavelength range may correspond to visible light and the second wavelength range may correspond to infrared light with a wavelength range closely around 830 nm due to Indocyanine green (ICG) fluorescence emission. By using a first operation mode, the autofocus system 100 can focus the object according to the visible light. By this means, the autofocus system 100 can be used to generate a sharp white light image of the object. By using a second operation mode, the autofocus system 100 can focus the object according to the visible light and the fluorescence light around 830 nm. By this means, the autofocus system 100 can be used to view a sharp image of the object being in focus for white light and for fluorescence light at around 830 nm. Further, the autofocus system 100 may function in a third operation mode wherein the object can be focused only according to the infrared light at 830 nm without considering the visible light.

In another embodiment, the autofocus system 100 may generate the output signal 106 using the first signal and the second signal without using the signal 104 comprising the information on the operation mode. For these implementations, an operation mode of the autofocus system may be determined automatically without receiving an external input by the signal 104. For example, the autofocus system 100 analyzes the first signal 102a and the second signal 102b according to a predetermined criterion. The predetermined criterion may consider e.g. an intensity of light referring to the first wavelength range or the second wavelength range. If the intensity light referring to the second wavelength range e.g. around 830 nm does not exceed a threshold the autofocus system 100 may automatically focus according to the first wavelength range referring to e.g. white light. Hence, the autofocus system 100 may determine the output signal 106 without receiving the information on the operation mode of e.g. a user. This implementation can be advantageous for further automatization of the autofocus system 100 for faster operation e.g. if an input from a user is not required or not suitable for the observed light.

In another embodiment, the autofocus system 100 may use three or more signals and optionally the information on the operation mode for generating the output signal. The third signal may be used for focusing the object according to a third wavelength range.

In the embodiment shown in FIG. 1, the first signal 102a comprises an image of an object in the first wavelength range and the second signal 102b comprises an image of the object in the second wavelength range. The image of the object in the first wavelength range, in the following referred to as the first image, can be generated by a first sensor and the image of the object in the second wavelength range, referred to as the second image, can be generated by a second sensor. The sensors may be able to detect the light from the object and to generate the signals 102a-b comprising an image of the object. Images can be white light images, binary images, fluorescence images or other types of images being generated by the sensor. The first and the second image can be similar or different from each other e.g. depending on a characteristic of the sensor such as spectral sensitivity or resolution.

In the described embodiment, the autofocus system 100 is further configured to use the first signal 102a to determine a first focus and the second signal 102b to determine a second focus. Further, the autofocus system 100 is configured to determine the focus setting information using the first focus and the second focus. In the embodiment, the first focus can be determined by analyzing the first signal 102a comprising the first image and the second focus can be determined by analyzing the second signal 102b comprising the second image. By this means, the autofocus system 100 is able to consider the first wavelength range independently from the second wavelength range for better focusing.

The separation into the first and the second focus may be advantageous to reduce the effect of dispersion when focusing an object. Imaging properties of optical elements such as lenses depend on the wavelength of light being projected. Thus, an observed object generating light with a broad wavelength range may not be focused appropriately if only one focus is considered. To be able to generate a sharp image of the object for a broad spectrum, the autofocus system 100 may use one focus for each wavelength range.

Figure 2:
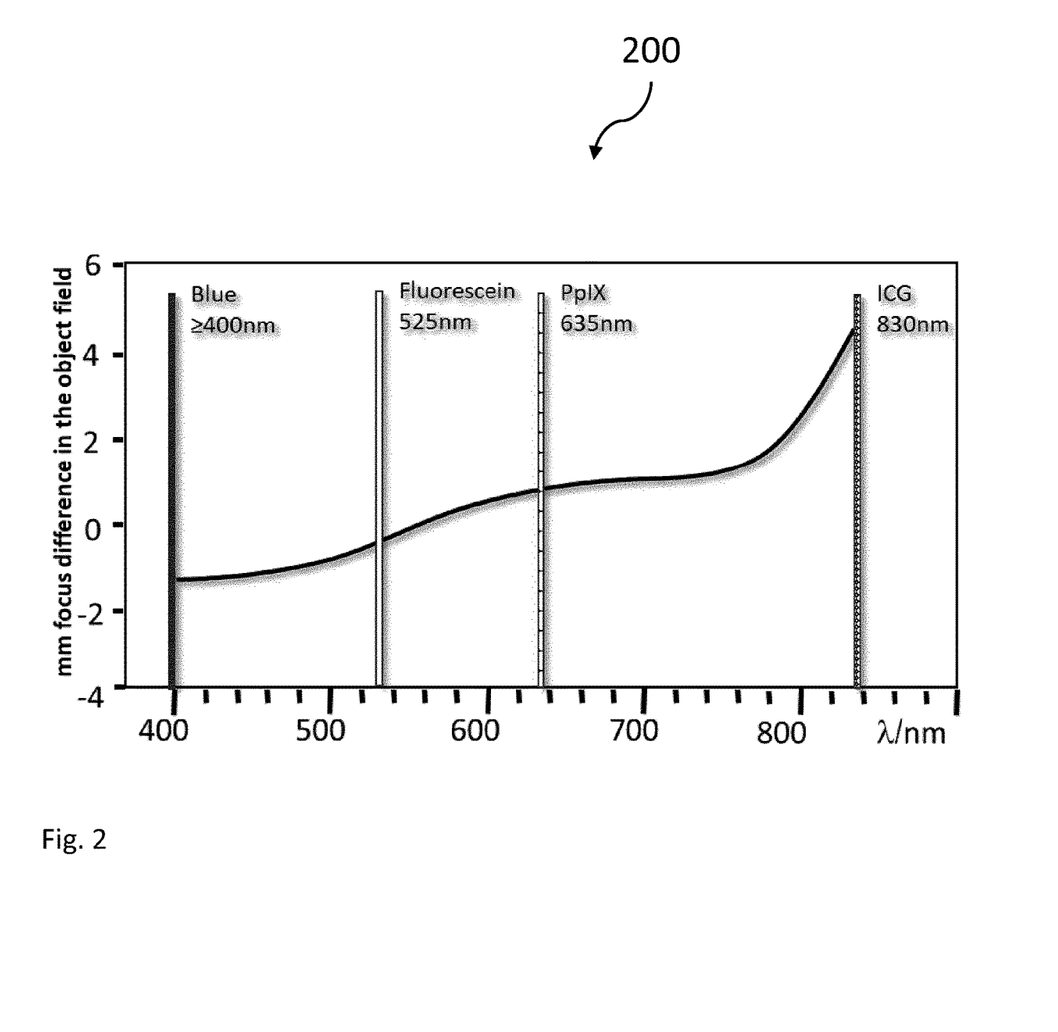
FIG. 2 illustrates an example of a diagram comprising focal positions depending on the wavelength.

Focus differences can be greater for high magnifications. FIG. 2 illustrates an example of a diagram 200 comprising focal positions depending on the wavelength when imaging with a surgical stereomicroscope at high magnifications. The focus difference can amount up to several millimeters such as 5.5 mm between a wavelength of 400 nm and 830 nm. Hence, if only one focus is considered for a broad wavelength range, blurred images can be generated due to wavelength dependent optical characteristics.

The first focus and the second focus can be determined by the images of the signals 102a-b, respectively. For example, images may comprise contrast information according to an intensity distribution over pixels. Sharp edges can be identified for areas comprising high intensity differences between adjacent pixels or high intensity slopes within a certain vicinity of pixels. A focus of an image can then be determined by e.g. increasing the contrast of the image for the considered wavelength range.

In other implementations, the autofocus system 100 may use different approaches for determining the focuses such as phase detection. Generally, the autofocus system 100 is not restricted to these examples and may use other methods of e.g. image analysis to determine a focus. For better analysis, the first and the second image can optionally be converted to secondary images via image processing. By this means, characteristics of the images can be revealed or emphasized such as e.g. edges, shapes, contrasts, intensity offsets etc. The autofocus system 100 may use a criterion such as a threshold to evaluate whether the image is sufficiently focused or not.

The first and the second focus can be used for determining the focus setting information. The focus setting information may comprise instructions for controlling optical elements or hardware components of e.g. a microscope for setting the determined focusses.

The process of determining the first and second focus can be iterative to determine an appropriate focus setting information. For example, in a first iteration the first and the second image are analyzed according to a contrast information. The autofocus system 100 may initially determine a temporary focus setting information e.g. used to set an intermediate focus. In a second iteration, the images focused according to contrast enhancement can be further analyzed and adjusted according to another criterium to determine another focus setting information used to set e.g. a second intermediate focus. Further iterations may be performed until a final focus setting information for sufficient focusing is determined.

In other implementations, the first and second focus can be determined in a single iteration to determine the focus setting information.

Figure 3:
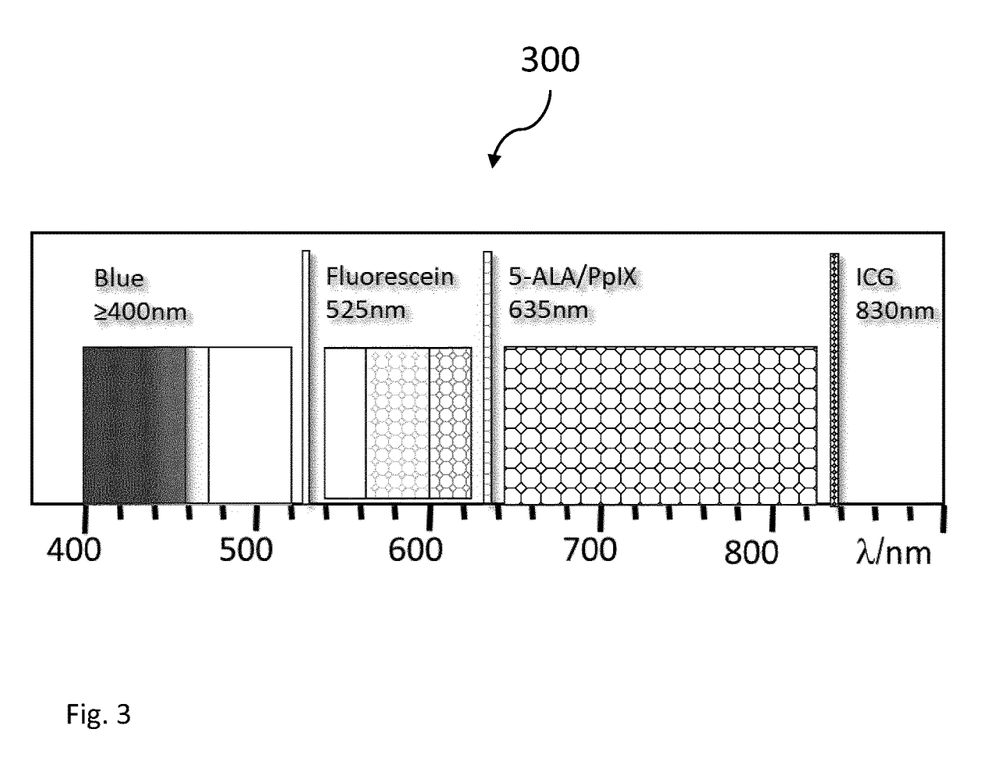
FIG. 3 illustrates an example of an observed light spectrum.

In the described embodiment of the autofocus system 100, the first wavelength range corresponds to visible light and the second wavelength range corresponds to fluorescence light emitted by the object. FIG. 3 illustrates schematically the wavelength range of visible light between approximately 400-800 nm and wavelengths for fluorescence light at 525 nm and 635 nm in the visible range and 830 nm in the near infrared range (NIR).

The observed spectrum comprising the illustrated wavelengths may be attributable to light caused by the observed object. For example, the observed object can be illuminated by a light source generating white light of appropriate intensity. White light indicating the first wavelength range might be reflected on the surface of the observed object. Further, the illuminating light of the light source may excite the object to emit fluorescence light indicating the second wavelength range.

The illustrated light spectrum of FIG. 3 comprises a broad wavelength range of around 830 nm and can be e.g. observed in surgical applications. For appropriate focusing it might be suitable to consider the spectrum regarding the first wavelength range of e.g. visible light and the second wavelength range at e.g. 830 nm. In other implementations, the wavelength ranges may correspond to different light such as ultraviolet light or light comprising an arbitrary wavelength range. For example, a wavelength range can be considered as narrow if a total interval of less than e.g. 30 nm is used or can be considered as broad if a total interval of more than 300 nm is used.

In a conventional implementation, the wavelength ranges may correspond to any light being detected. The spectrum is not restricted to the example given in FIG. 3 and may comprise lower, higher, broader, sharper or other ranges than illustrated.

According to an implementation, the autofocus system 100 can be used as a standalone system receiving the first and the second signal from a separate system. The output signal generated by the autofocus system 100 can be used by the separate system to provide autofocusing e.g. for better imaging.

According to another implementation, the autofocus system 100 may be a component of main system such as an optical system.

Figure 4:
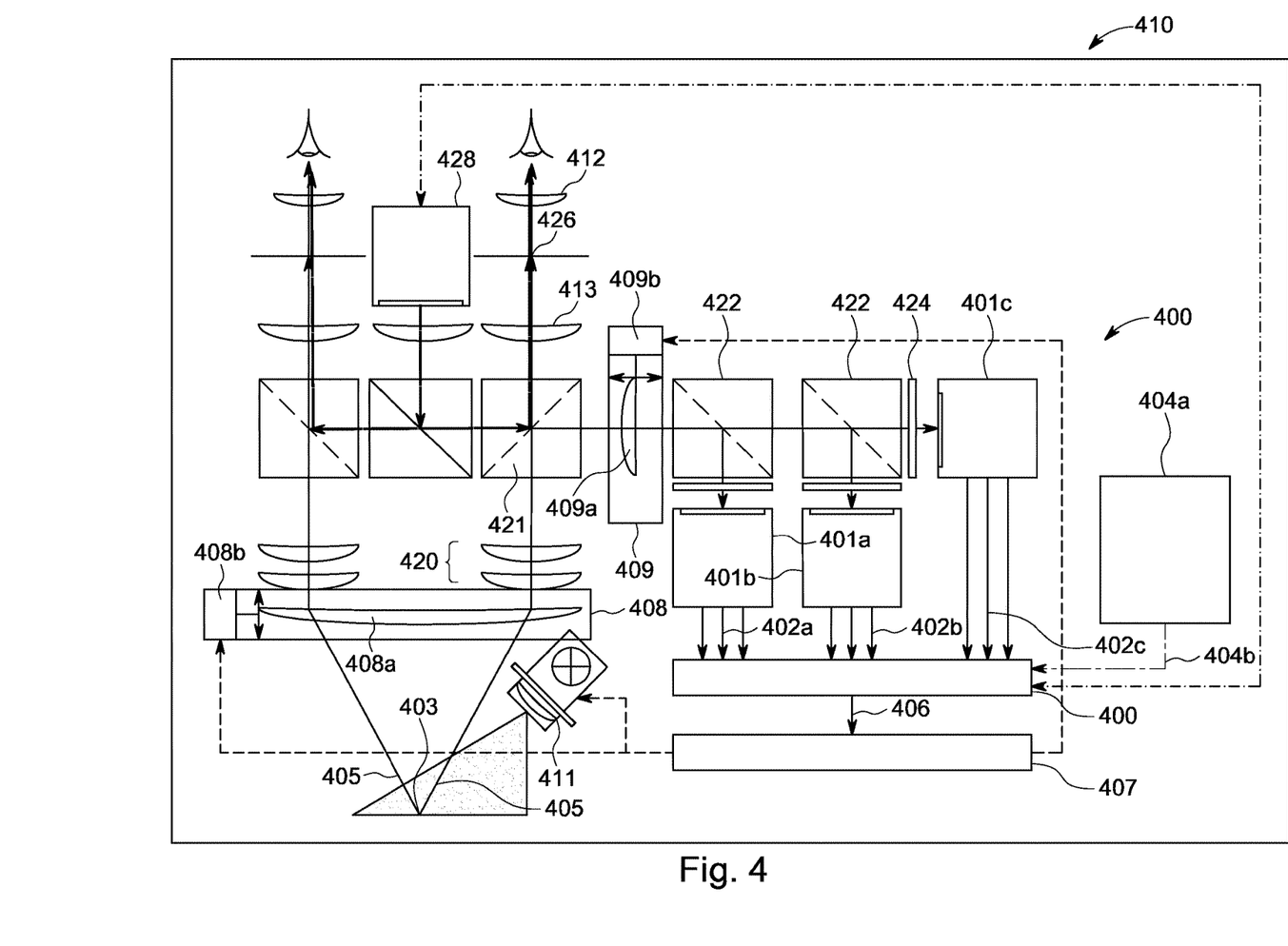
FIG. 4 illustrates an embodiment of an optical system.

FIG. 4 shows an embodiment of an optical system 410 comprising an autofocus system 400 according to the previous description. The optical system 410 comprises three sensors 401ac generating signals 402a-c, respectively. The first sensor 401a is configured to generate a first image in the first wavelength range corresponding to visible light. The second sensor 401b is configured to generate a second image in the second wavelength range corresponding to fluorescence light at 635 nm. The third sensor 401c is configured to generate a third image in the third wavelength range corresponding to fluorescence light at 830 nm. In other implementations, the wavelength ranges may be different from the discussed embodiment.

The optical system 410 further comprises an operation unit 404a generating a signal 404b comprising information on an operation mode. The autofocus system 400 can use the signals 402a-c from the sensors 401a-c and the signal 404b from the operation unit 404a to generate an output signal 406. The output signal 406 can be used by a controller 407.

In the embodiment, the controller 407 is configured to control a focus system of the optical system 410 using the output signal 406. The focus system comprises a main focus system 408 and a fine focus system 409. Optionally, the controller 407 may further control an illumination system 411 illuminating an object 403.

In the embodiment of the optical system 410, the main focus system 408 comprises a main lens 408a and an actuator 408b to control the main lens 408a. Further, the fine focus system comprises a fine focusing lens 409a and an actuator 409b to control the fine focusing lens 409a.

After receiving the output signal 406, the controller 407 may send the actuator 408b of the main focus system 408 a control signal. The control signal may prompt the actuator 408b to move the main lens 408a according to the specifications to change a focus. For example, the main lens 408a can be moved for focusing the observed object 403 according to the first wavelength range. By adjusting the position of the main lens 408a, a sharp intermediate image 426 can be generated and observed via an ocular 412.

Further, the controller 407 may send the control signal to the actuator 409b of the fine focus system 409. The control signal may prompt the actuator 409b to move the fine focusing lens 409a according to the specifications to change a focus. For example, the fine focusing lens 409a can be moved for focusing the observed object 403 according to the second wavelength range. By adjusting the position of the fine focusing lens 409a, a sharp image can be generated on the surface of the second sensor 401b. As generating the intermediate image 426 uses a first optical path and generating the image on the surface of the second sensor 401b uses a second optical path, interaction during focus setting for both wavelength ranges can be avoided.

In other implementations, the optical system 410 may comprise more than one fine focusing system such as one fine focusing system for each sensor 401 a-c. Each fine focusing system may be implemented and configured independently from each sensor. For example, each fine focusing system may focus an image on the surface of its corresponding sensor. Hence, each fine focusing lens can be moved for focusing the observed object 403 according to the specific wavelength range being considered.

According to another implementations, the main focus system 408 may be used for the first sensor and the fine focus system 409 may be used for the second sensor. The main focus system 408 can be also used for all sensors such as to set a focus which can be further finetuned by the fine focus system. The fine focus system 409 may be also used for the first sensor, the third sensor or for all sensors simultaneously. In a conventional implementation, the main focus system may be used to generate a focused intermediate image 426 for viewing and the fine focus system may be used to generate a fine-focused image on the surface of at least one sensor.

The main focus system 408 and fine focus system 409 are not restricted to this implementation and may comprise further optical elements such as filters, further lenses, apertures or further elements for controlling.

For better understanding, the optical path and further optical components of the optical system 410 are discussed hereafter.

The observed object 403 can be illuminated by the illumination system 411. The illumination system 411 may generate light with different intensities or of different spectra. For example, the illumination system 411 comprises a bulb for generating light with a wavelength range of 400-800 nm, multiple, selectable white light and fluorescence excitation filters or other optical components for illumination or fluorescence excitation. The observed object 403 may reflect visible light and emit fluorescence light.

The main lens 408a of the main focus system 408 may project the incoming light to a zoom system 420 comprising e.g. movable lenses. The zoom system 420 can direct the light to a beam splitter 421 comprising e.g. semitransparent mirrors or prisms. The beam splitter 421 can generate two optical paths of the incoming light. As described above, the first optical path can be used for observing the intermediate image 426 via the ocular 412 and the second optical path can be used for imaging on the sensors 401a-c. For focusing the light from the beam splitter 421, a tube lens 413 can be used. The light of the second optical path can be focused by the fine focusing lens 409b onto the surface of the sensors 401a-c.

To direct portions of the second beam path to several sensors 404a-c, further beam splitter 422 can be used. The beam splitter 422 may comprise a coating. Filters 424 can be arranged between beam splitters 422 and sensors 401a-c. The coating of the beam splitter 422 and the filters 424 may define the spectrum of light being received by each sensor 401a-c. The sensors 401a-c may comprise further filters such as RGB filters. According to an implementation, the sensor 401a may detect a broad range of visible light, sensor 401b fluorescence emissions at 635 nm and sensor 401c fluorescence emissions at 830 nm. For example, sensors 401a-c are camera or video sensors such as CCD or CMOS sensors generating the signals 402a-c comprising the image information. The signals 402a-c can comprise different information according to different narrow or broad spectral ranges of the detected light.

The signals 402a-c can be received and further processed by the autofocus system 400 to focus the observed object 403 according to the considered wavelength ranges. The autofocus system 400 can determine a focus setting information also by using the operation mode determined by a user of the optical system 410.

According to the embodiment in FIG. 4, the optical system 410 further comprises an imaging system 428. The imaging system 428 can provide a single sharp image by combining two or more focused images each based on a specific wavelength range. A combination of an image being in focus for the first wavelength range with an image being in focus for the second wavelength range can be realized e.g. according to one of the following implementations:

In a conventional implementation, an image such as the second image generated on the surface of the second sensor can be injected into an observation beam path of the optical system 410. The observation beam path may comprise the image plane in which the intermediate image 426 is generated for viewing via the ocular 412. For example, if the sensor image being in focus according to the second wavelength range is overlaid to the intermediate image 426 being in focus according to the first wavelength range, a single sharp image can be observed via the ocular 412.

The imaging system 428 may enable to observe a combined image indicating a visible and invisible light spectrum. For example, the signal of the second sensor using ultraviolet (UV) fluorescence light is injected to the visible intermediate image 426. By this means, a visible representation of the UV fluorescence light, e.g. providing the fluorescence information in pseudo color, can be observed in combination with the visible intermediate image 426. This combined information can be observed via the ocular 412 such that an observer can keep his perspective without turning his head towards a monitor.

In another implementation, the imaging system 428 is configured to combine the first image of the first sensor 401a and the second image of the second senor 401b into an observable image. The observable image can be generated digitally such that a 2D or 3D image can be displayed on one or more screens. In some other implantations, the imaging system 428 uses also the third image to generate the observable image.

According to the embodiment in FIG. 4, the optical system 410 is a microscope such as a stereomicroscope comprising a second ocular for viewing. The microscope comprises further optical elements such as additional beam splitter, lenses, zoom systems, filters, prisms or other components to view a further intermediate image by the second ocular. The imaging system 428 may combine an image of a sensor with one or both intermediate images.

In another implementation, the optical system 410 is a surgical microscope. A physician may use the surgical microscope in a first operation mode focusing objects according to white light or in a second or third operation mode focusing objects according to different fluorescence light e.g. Protoporphyrin IX (PpIX) or Indocyanine green (ICG) emissions. The first operation mode of white light can be used for analyzing a topology or structure of e.g. tissue, organs, vessels or any anatomical or biological structure to be observed in vivo or in vitro. The second or third operation mode of fluorescence light may be used to analyze e.g. physiological properties of the observed object such as anomalous characteristics, areas of insufficient blood flow or areas comprising malignant cells such as tumor cells. As physiological processes such as blood flow characteristics are only observable during a short time range of e.g. 10s, the autofocus system 400 can be beneficial to provide fast, automatic and appropriate focusing of the object.

The discussed embodiments are described for better understanding and are not to be interpreted in a restrictive way. Similarly, the illustrated figures are given to better understand the features and function of the autofocus system or optical system only. The autofocus system 100 can also be used in other applications such as in camera systems, video systems, other microscope systems or other optical systems suitable for observing or focusing objects regarding different wavelength ranges. The autofocus system can be used in surgery, laboratory, photography or for any workflow comprising imaging or focusing on objects. The arrangement and orientation of the elements such as optical elements, units or systems can differ for from the positions as shown in the figures.

In the following, further possible implementations or applications of the autofocus system 100 or optical system 410 are described.

An operator of the optical system 410 can decide if the main lens 408a and his view will adapt the focus via the main focus system 408 or if he keeps his focus and just the image of the sensor is focused via the fine focus system 409.

One or more cameras comprising sensors 404a-c with filters 424 or coatings can read different parts of light spectrum of observed light 405 and the generated signals can be used for determining the focus setting information.

The illumination system 411 can be coupled with the operation unit 404a. According to a chosen operation mode, characteristics of the illuminating light e.g. intensity or wavelength range may change.

Reading and analysis of the sufficient focus for each wavelength range can be done constantly. If the operation mode changes, the main lens 408a and/or the fine focusing lens 409a can be moved directly to the determined focal position with or without analyzing the image on the sensor.

The autofocus system 100 can restart image analysis if e.g. the operator switches from any operation mode to another. The autofocus system 100 can analyze important or main structures in e.g. the fluorescence image to focus on. If appropriate, image analysis can be restricted to a Region of Interest (ROI) so that the image can primarily be in focus at this region.

According to another implementation, the autofocus analysis is done when switching from any operation mode to another.

Figure 5:
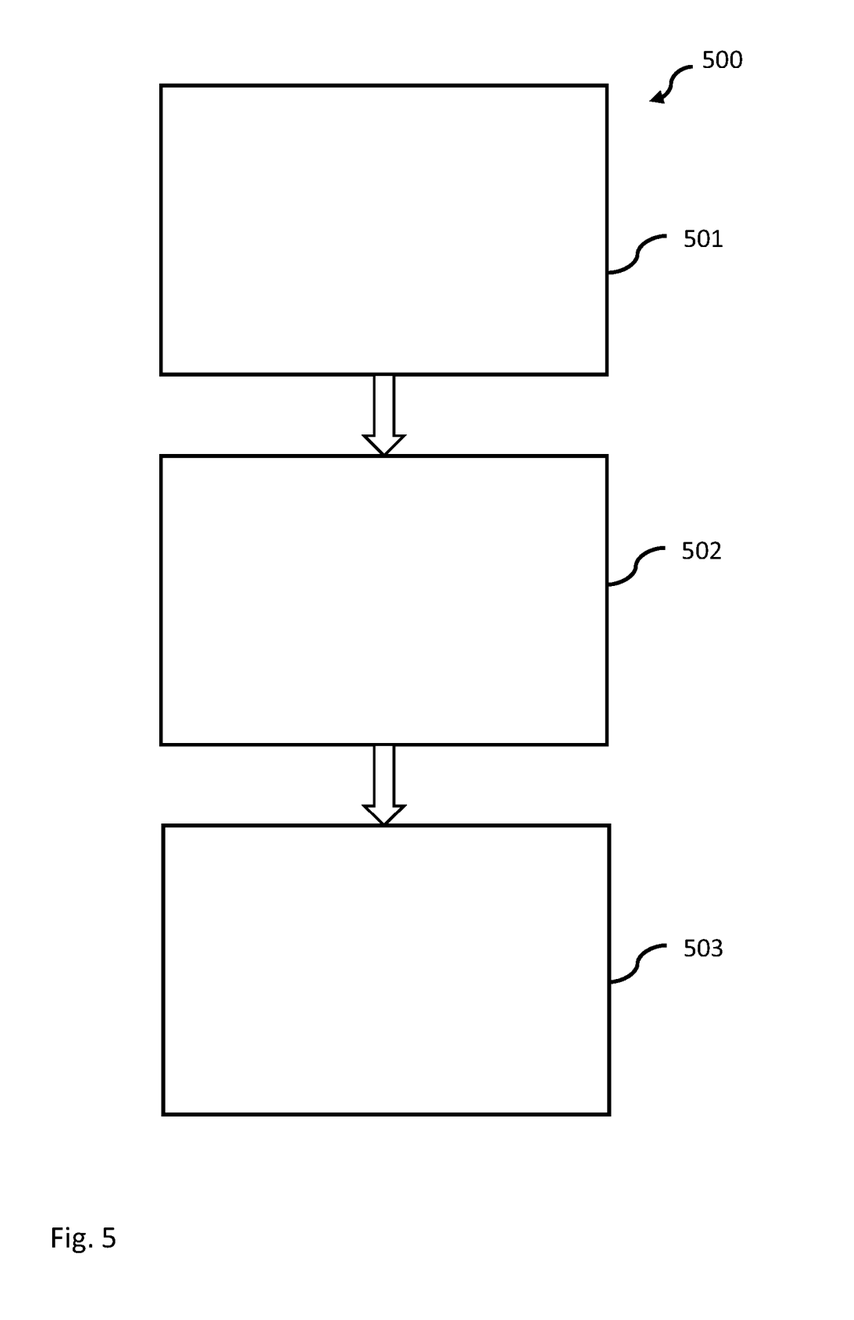
FIG. 5 illustrates a flow chart of an embodiment of a method for the autofocus system.

FIG. 5 illustrates a flowchart of an embodiment of a method 500 for an autofocus system. The method comprises receiving 501 a first signal corresponding to a first wavelength range and receiving 502 a second signal corresponding to a second wavelength range. Further, the method comprises determining 503 an output signal comprising a focus setting information using the first signal and the second signal.

Figure 6:
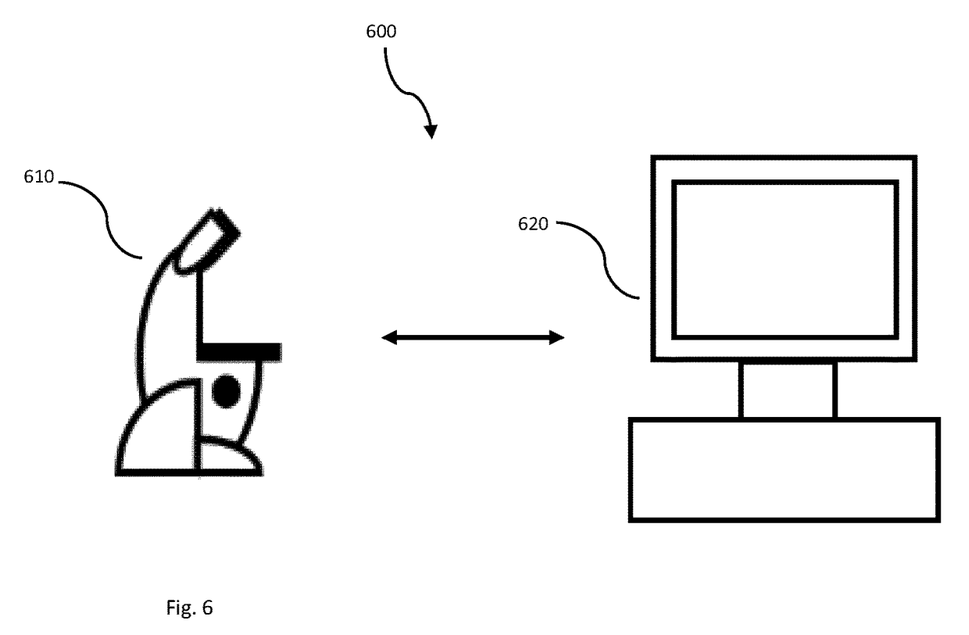
FIG. 6 illustrates a system configured to perform the method for the autofocus system.

Some embodiments relate to a microscope comprising a system as described in connection with one or more of the FIGS. 1 to 5. Alternatively, a microscope may be part of or connected to a system as described in connection with one or more of the FIGS. 1 to 5. FIG. 6 shows a schematic illustration of a system 600 configured to perform a method described herein. The system 600 comprises a microscope 610 and a computer system 620. The microscope 610 is configured to take images and is connected to the computer system 620. The computer system 620 is configured to execute at least a part of a method described herein. The computer system 620 may be configured to execute a machine learning algorithm. The computer system 620 and microscope 610 may be separate entities but can also be integrated together in one common housing. The computer system 620 may be part of a central processing system of the microscope 610 and/or the computer system 620 may be part of a subcomponent of the microscope 610, such as a sensor, an actor, a camera or an illumination unit, etc. of the microscope 610.

The computer system 620 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 620 may comprise any circuit or combination of circuits. In one embodiment, the computer system 620 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 620 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 620 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 620 may also include a display device, one or more speakers, and a keyboard and/or controller, which can include a mouse, trackball, touch screen, voice-recognition device, or any other device that permits a system user to input information into and receive information from the computer system 620.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a nontransitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 Autofocus system
102a, b First signal, second signal
104 Signal comprising information on operation mode
106 Output signal comprising focus setting information
200 Example of a diagram showing focal positions depending on the wavelength
300 Example of an observed light spectrum
400 Autofocus system
401a-c Sensor
402a-c Signal
403 Object
404a Operation unit
404b Signal comprising information on operation mode
405 Observed light
406 Output signal comprising focus setting information
407 Controller
408 Main focus system
408a Main lens
408b Actuator for main lens
409 Fine focus system
409a Fine focusing lens
409b Actuator for fine focusing lens
410 Microscope
411 Illumination system
412 Ocular
413 Tube lens
420 Zoom system
421 Beam splitter
422 Beam splitter optionally with coating
424 Filter
426 Intermediate image
428 Imaging system
500 Method for an autofocus system
501 Receiving a first signal corresponding to a first wavelength range
502 Receiving a second signal corresponding to a second wavelength range
503 Determining an output signal comprising a focus setting information using the first signal and the second signal
600 System
610 Microscope
620 Computer system

The invention claimed is:

1. An optical system comprising:
an autofocus system configured to:
receive a first signal corresponding to a first wavelength range;
receive a second signal corresponding to a second wavelength range;
receive information on an operation mode, the operation mode indicating a use of the first wavelength range or the second wavelength range; and
determine an output signal comprising focus setting information using the first signal and the second signal based on the information on the operation mode;
a controller configured to control a focus system of the optical system using the output signal;
a first sensor configured to generate a first image in the first wavelength range;
a second sensor configured to generate a second image in the second wavelength range; and
an imaging system configured to combine the first image and the second image into an observable image,
wherein the autofocus system is configured to use the first signal to determine a first focus and the second signal to determine a second focus, wherein the first image is generated with the first focus and the second image is generated with the second focus.

2. The optical system according to claim 1, wherein the focus system comprises:
a main focus system for the first sensor; and
a fine focus system for the second sensor.

3. The optical system of claim 1, wherein the optical system is a microscope or a surgical microscope.

4. The optical system of claim 1, wherein the first signal comprises an image of an object in the first wavelength range and the second signal comprises an image of the object in the second wavelength range.

5. The optical system of claim 1, wherein the first wavelength range corresponds to visible light and the second wavelength range corresponds to fluorescence light emitted by an object.

6. A method for an autofocus system, comprising
receiving a first signal corresponding to a first wavelength range;
receiving a second signal corresponding to a second wavelength range;
receiving information on an operation mode, the operation mode indicating a use of the first wavelength range or the second wavelength range;

determining an output signal comprising focus setting information using the first signal and the second signal based on the information on the operation mode;

generating a first image in the first wavelength range;

generating a second image in the second wavelength range; and combining the first image and the second image into an observable image, wherein a first focus is determined using the first signal and a second focus is determined using the second signal, and the first image is generated with the first focus and the second image is generated with the second focus.

7. The method according to claim 6, wherein the first signal comprises an image of an object in the first wavelength range and the second signal comprises an image of the object in the second wavelength range.

8. A computer program with a program code for performing the method according to claim 6 when the computer program is executed by a processor.

9. The method of claim 6, wherein the first wavelength range corresponds to visible light and the second wavelength range corresponds to fluorescence light emitted by an object.

* * * * *